Feb. 27, 1923.

W. G. COX

SPRING BUMPER FOR MOTOR VEHICLES

Filed Sept. 1, 1922

INVENTOR
W. G. COX.

Feb. 27, 1923.
W. G. COX
1,446,616
SPRING BUMPER FOR MOTOR VEHICLES
Filed Sept. 1, 1922    2 sheets-sheet 2
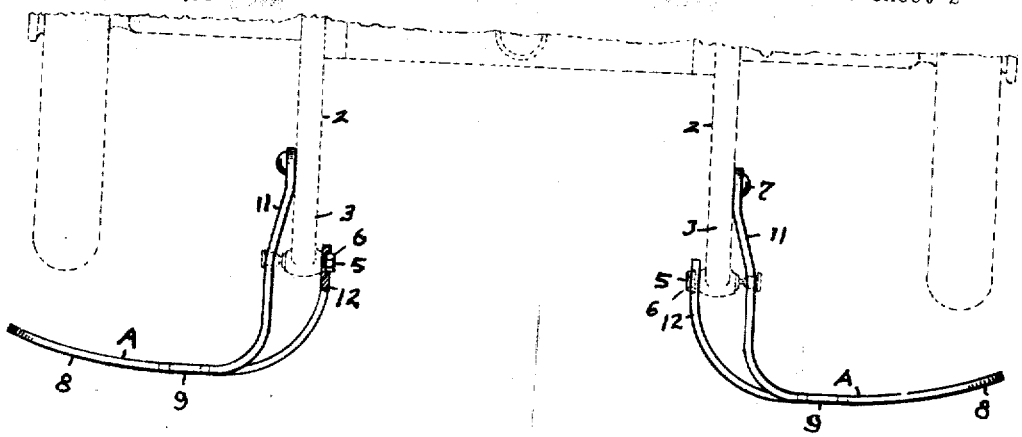
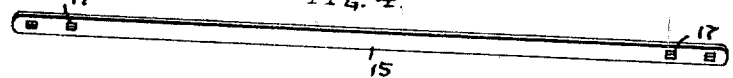
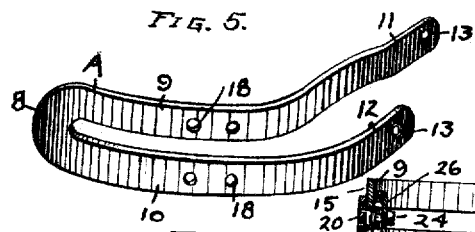
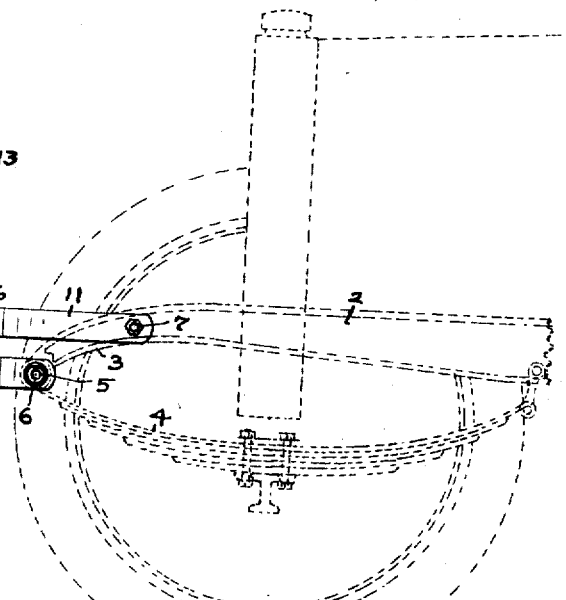
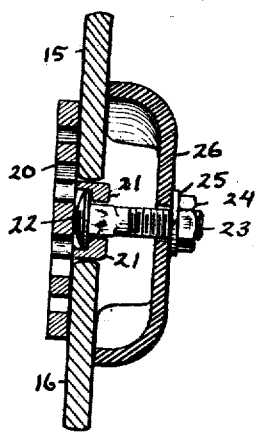
Inventor
W. G. COX.

Patented Feb. 27, 1923.

1,446,616

UNITED STATES PATENT OFFICE.

WILLIAM G. COX, OF CLEVELAND, OHIO, ASSIGNOR TO COX BRASS MANUFACTURING COMPANY, OF ALBANY, NEW YORK, A CORPORATION OF NEW YORK.

SPRING BUMPER FOR MOTOR VEHICLES.

Application filed September 1, 1922. Serial No. 585,594.

*To all whom it may concern:*

Be it known that I, WILLIAM G. COX, a citizen of the United States, residing at Cleveland, in the county of Cuyahoga and State of Ohio, have invented certain new and useful Improvements in a Spring Bumper for Motor Vehicles, of which the following is a specification.

My invention relates to an improvement in a spring bumper for motor-vehicles, and my general object is to provide a wide faced bumper of simple form and pleasing appearance in which the end portions are separate sections made of flat spring bars bent to provide a pair of spaced arms adapted to facilitate attachment thereof to the motor vehicle frame and also doubled edgewise to provide round ends and parallel horizontal impact faces adapted to permit a middle or main impact section, preferably composed of a plural number of spring bars, to be connected at their opposite ends to said end sections as a continuation of said parallel impact faces.

Figure 1:
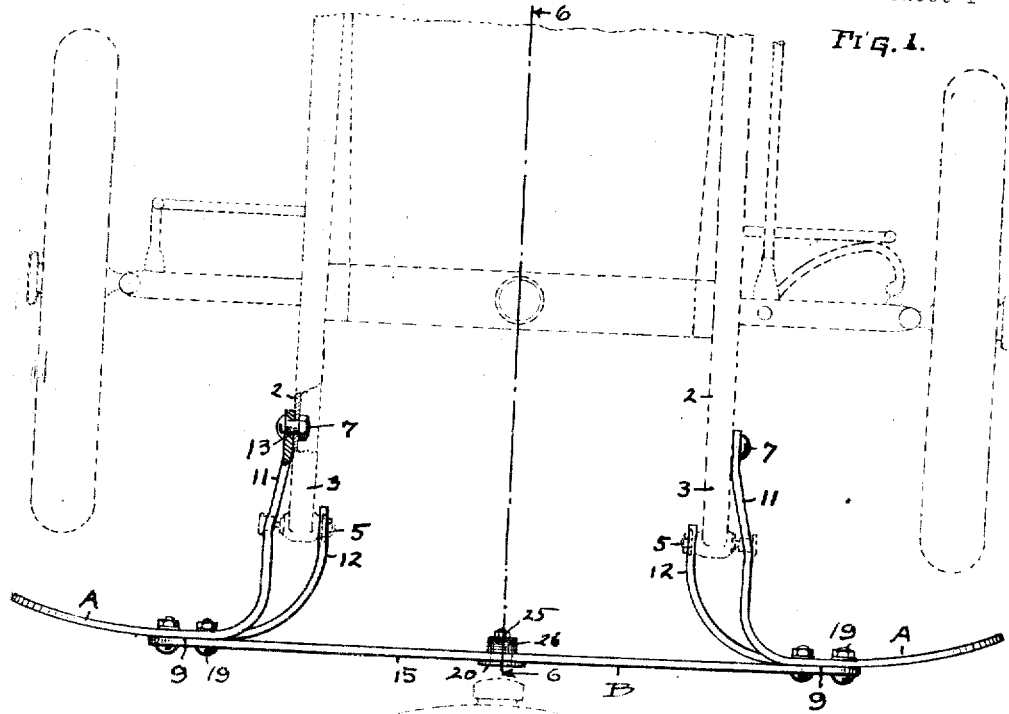
Figure 2:
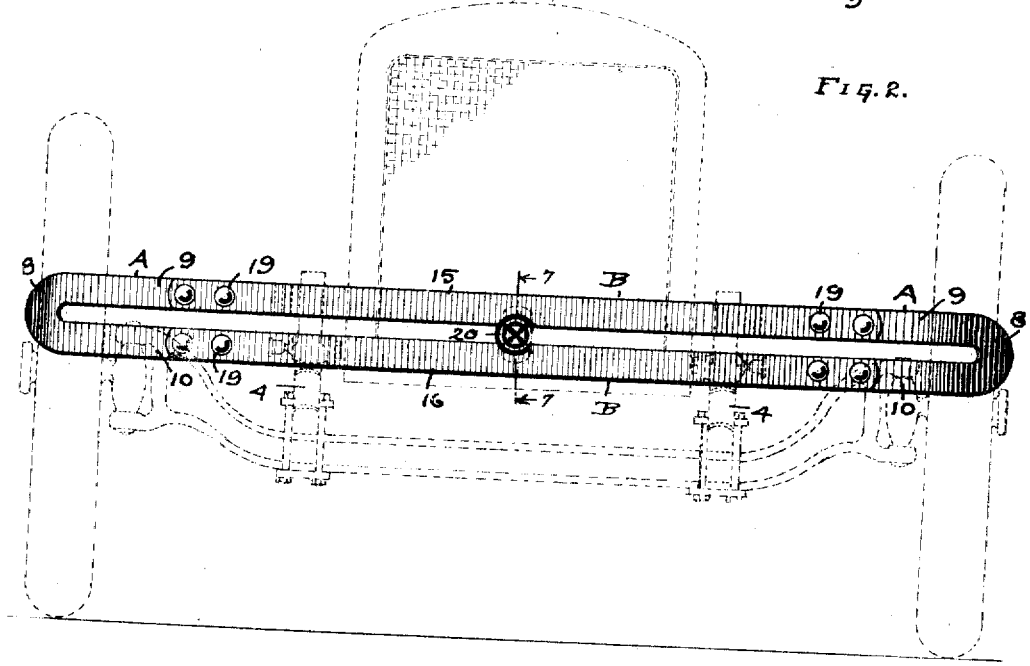

In the annexed drawings Fig. 1 is a horizontal plan of my improved bumper mounted on the front end of a motor vehicle which is shown in dotted lines, and Fig. 2 is a front view of the same parts. Fig. 3 is a plan view corresponding to Fig. 1, but showing the middle impact bars removed. Fig. 4 is a perspective view of one of the middle or main impact bars. Fig. 5 is a perspective view of one of the bumper end sections. Fig. 6 is a side view in dotted lines of the front end of a motor vehicle and a vertical section of the bumper on line 6—6 of Fig. 4. Fig. 7 is an enlarged vertical section on line 7—7 of Fig. 2 showing an anti-rattling and spacing device clamped between the two main impact bars.

In general the chassis frames of motor vehicles comprise side members 2 having their front ends 3 curved downwardly and recessed at their extremities to receive the terminal eyes of the front suspension springs 4 of the vehicle. A shackle bolt 5 is used to secure the front eye of each spring to the perforated end of each side member 2. This bolt is at a lower elevation than the straight part of the side members 2 and this relationship of parts is utilized in the present device to promote the attachment of a separate bumper section A to each side member 2, using shackle bolts 5 and its nut 6 and another bolt 7 or equivalent means to support the same. Thus, each end section A consists of a U-shaped member made of a flat spring-steel bar bent edgewise to provide a flat bow end 8 and two flat impact portions 9 and 10, respectively, lying in the same vertical plane and extending parallel with each other horizontally for a substantial distance from the rounded end 8 before being bent rearwardly in the flat on curved and straight lines to provide two parallel supporting arms 11 and 12, respectively, one above the other, each arm having a perforation or bolt opening 13 near its extremity. The upper arm 11 is relatively longer than lower arm 12 and spaced apart horizontally and vertically therefrom to permit it to be attached by a suitable bolt 7 to the outer side of the curved end of frame member 2. The lower arm 12 is curved in greater degree than the upper arm to place it on the inside of the curved end of the frame where it may be fastened rigidly in place by shackle bolt 5 and nut 6, see Figs. 1 and 3, and by referring to Fig. 6 of the drawings it will be seen that these two arms extend forwardly on parallel lines and place the two impact faces 9 and 10 in the same vertical plane. The end sections A—A are exactly alike except that they extend to the left and right opposite the two front wheels and wheel fenders of the vehicle when attached to the frame as described, and the bow ends of these sections may be curved rearwardly more or less to deflect striking objects and to give the bumper a more pleasing appearance.

The middle section B comprises two straight spring-steel bars 15 and 16 having one or more square bolt holes 17 in their opposite ends which are adapted to register with a like number of round bolt holes 18 in the front impact portions 9 and 10 of the end sections A, and suitable carriage bolts 19 may be used to detachably unite the parts together. The preferred way is to fasten the two main impact bars 15 and 16 in parallel alignment, the upper bar 15 being used to tie and connect the upper arms 11 of the two end sections A together, and the lower bar 16 being employed to tie and connect the lower arms 12 together, each bar bridging the space between said arms, and the impact portions 9 and 10 of the end sections extending the impact area to the bow portion 8 which give the bumper the appearance of an elongated loop viewed from the front as shown in Fig. 2, although actually having two supporting arms behind the upper bar 15 and still another pair of supporting arms behind the lower bar 16.

In Figs. 2 and 7 I show an ornamental disk 20 having a pair of channeled ribs 21 at its rear side, which extend through the gap or space between the upper and lower bars 15 and 16 and serve to seat and hold the head 22 of a short bolt 23 having a nut 24 and lock washer 25 adapted to fasten a clip member 26 tightly against the rear face of the two bars. The disk 20 is separable from the bolt to permit different kinds of ornamental disks to be clamped to the bars, and while this device is not actually essential to the bumper it serves to prevent independent vibration and rattle of the two bars especially if the bars are thin and easily flexed.

What I claim, is—

1. A spring bumper for motor vehicles, comprising a pair of separate end sections each comprising a pair of spaced attachment arms and parallel horizontal impact portions, and a main impact section connected with said end sections, interjacent said end impact portions.

2. A spring bumper for motor vehicles, comprising separate end impact sections of bow-shape each having a pair of attachment arms formed integral therewith, and an interjacent section uniting said end sections together.

3. A spring bumper for motor vehicles, comprising bow-shaped end sections forming extended vertically-spaced end impact portions, and a plural number of bars interjacent said end sections and uniting the same together.

4. A spring bumper for motor vehicles, comprising bow-shaped end sections having parallel impact portions, and a pair of spring bars uniting said end sections and forming a middle impact section.

5. A spring bumper for motor vehicles, comprising separate end sections made of flat spring bars doubled edgewise and providing double impact portions, and separate spring bars connected at their opposite ends to said end sections interjacent said impact portions.

6. A spring bumper for motor vehicles, comprising bow-shaped impact sections at the ends having rearwardly-extending attachment arms, and a plural number of flat spring bars secured horizontally one above the other at their opposite ends to said end sections.

7. A spring bumper for motor-vehicles, comprising a main impact section and separate end sections united together, each end section being made of a flat bar doubled edge-wise into parallel relation vertically to provide double impact faces and having the end portions of the bar bent rearwardly in spaced relation horizontally to provide spaced attachment arms.

8. A spring bumper for motor-vehicles, comprising separate end sections and a middle impact section united together, each end section being of U-shape and having legs of different lengths, and the middle section consisting of separate bars connected at their ends with the legs of said end sections.

9. In a sectional bumper for motor-vehicles, an end section made of a flat bar doubled edge-wise and parallel to provide a rounded end and double impact faces and having the parallel portions thereof of different length and bent in the flat at an angle to the impact portion and also spaced apart horizontally to permit attachment thereof to a vehicle frame.

10. A spring bumper for motor vehicles, comprising two parallelly-spaced main impact bars, a spacing device between said bars having channeled ribs at its rear side, a horizontal bolt having a head engaged with said channeled ribs, and a clamping clip means detachably connected with said bolt adapted to engage the rear side of said bars.

In testimony whereof I affix my signature.

WILLIAM G. COX.